United States Patent
Mueller et al.

(10) Patent No.: US 11,679,359 B2
(45) Date of Patent: Jun. 20, 2023

(54) METHOD FOR PRODUCING CATALYTICALLY ACTIVE WALL FLOW FILTERS

(71) Applicant: UMICORE AG & CO. KG, Hanau-Wolfgang (DE)

(72) Inventors: Astrid Mueller, Frankfurt (DE); Meike Antonia Gotthardt, Frankfurt (DE); Martin Foerster, Buedingen (DE); Stephanie Spiess, Darmstadt (DE); Yannic Weigl, Obertshausen (DE); Carsten Herzog, Sinntal (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/420,455

(22) PCT Filed: Jan. 2, 2020

(86) PCT No.: PCT/EP2020/050009
§ 371 (c)(1),
(2) Date: Jul. 2, 2021

(87) PCT Pub. No.: WO2020/141190
PCT Pub. Date: Jul. 9, 2020

(65) Prior Publication Data
US 2022/0080355 A1 Mar. 17, 2022

(30) Foreign Application Priority Data
Jan. 4, 2019 (DE) .................... 10 2019 100 099.8

(51) Int. Cl.
*F01N 3/022* (2006.01)
*B01D 53/94* (2006.01)

(52) U.S. Cl.
CPC ....... *B01D 53/9472* (2013.01); *F01N 3/0222* (2013.01); *B01D 2255/9155* (2013.01); *F01N 2510/0682* (2013.01)

(58) Field of Classification Search
CPC ............ B01D 2255/9155; B01D 53/94; B01D 53/9472; F01N 2510/0682; F01N 3/00; F01N 3/021; F01N 3/0222; Y02T 10/12
See application file for complete search history.

(56) References Cited

U.S. PATENT DOCUMENTS

| 4,010,013 A | 3/1977 | Murayama |
| 4,351,811 A | 9/1982 | Matsuda et al. |

(Continued)

FOREIGN PATENT DOCUMENTS

| DE | 2832002 A1 | 1/1979 |
| DE | 10 2008 010388 A1 | 9/2009 |

(Continued)

OTHER PUBLICATIONS

German Office Action dated Nov. 30, 2021 for German Patent Application No. 10 2019 100 099.8 (5 pages in German with machine translation).

(Continued)

*Primary Examiner* — Carl C Staubach
*Assistant Examiner* — Diem T Tran
(74) *Attorney, Agent, or Firm* — Smith, Gambrell & Russell, LLP

(57) ABSTRACT

The present invention relates to a wall flow filter, to a method for the production and the use of the filter for reducing harmful exhaust gases of an internal combustion engine. Particle filters are commonly used for filtering exhaust gases from a combustion process. Also disclosed are novel filter substrates and their specific use in exhaust gas aftertreatment.

21 Claims, 4 Drawing Sheets

Pattern 1

Pattern 2

(56) References Cited

U.S. PATENT DOCUMENTS

Figure 1:
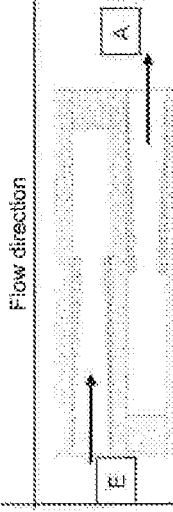

| | | | |
|---|---|---|---|
| 6,843,971 B2 | 1/2005 | Schäfer-Sindlinger et al. | |
| 6,875,725 B2 | 4/2005 | Lindner et al. | |
| 7,094,728 B2 | 8/2006 | Yan et al. | |
| 8,394,348 B1 | 3/2013 | Nunan et al. | |
| 8,431,186 B2 | 4/2013 | Jeske et al. | |
| 8,454,917 B2 | 6/2013 | Hoyer et al. | |
| 8,557,204 B2 | 10/2013 | Nunan et al. | |
| 8,663,588 B2 | 3/2014 | Lindner et al. | |
| 8,709,365 B2 | 4/2014 | Dornhaus et al. | |
| 8,794,178 B2 | 8/2014 | Mergner et al. | |
| 9,517,462 B2 | 12/2016 | Roesch et al. | |
| 9,551,253 B2 | 1/2017 | Fehnle et al. | |
| 2005/0031514 A1* | 2/2005 | Patchett | B01D 5/009 422/177 |
| 2006/0010857 A1 | 1/2006 | Hu et al. | |
| 2008/0107806 A1 | 5/2008 | Mergner et al. | |
| 2018/0221855 A1 | 8/2018 | Reith et al. | |
| 2018/0264446 A1 | 9/2018 | Burgess et al. | |

FOREIGN PATENT DOCUMENTS

| | | |
|---|---|---|
| DE | 20 2010 018134 U1 | 3/2014 |
| EP | 0 311 758 A1 | 4/1989 |
| EP | 0 324 082 A1 | 7/1989 |
| EP | 1 181 970 B1 | 2/2004 |
| EP | 1 147 801 B1 | 9/2004 |
| EP | 1 541 220 B1 | 2/2014 |
| EP | 1 716 903 B1 | 4/2014 |
| EP | 2 650 042 B1 | 11/2014 |
| JP | H01-151706 A | 6/1989 |
| WO | 01/10573 A2 | 2/2001 |
| WO | 2004/076829 A1 | 9/2004 |
| WO | 2005/016497 A1 | 2/2005 |
| WO | 2006/021338 A1 | 3/2006 |
| WO | 2006/021339 A1 | 3/2006 |
| WO | 2006/042699 A1 | 4/2006 |
| WO | 2008/000449 A2 | 1/2008 |
| WO | 2008/113445 A1 | 9/2008 |
| WO | 2009/103699 A1 | 8/2009 |
| WO | 2010/097146 A1 | 9/2010 |
| WO | 2011/098450 A1 | 8/2011 |
| WO | 2012/175409 A1 | 12/2012 |
| WO | 2013/070519 A1 | 5/2013 |
| WO | 2013/092707 A1 | 6/2013 |
| WO | 2015/143191 A1 | 9/2015 |
| WO | 2015/145122 A2 | 10/2015 |
| WO | 2018/081247 A1 | 5/2018 |
| WO | 2018/141887 A1 | 8/2018 |
| WO | 2018/183457 A1 | 10/2018 |

OTHER PUBLICATIONS

International Search Report dated Feb. 27, 2020 for International Patent Application No. PCT/EP2020/050009 (3 pages in German with English Translation).

Written Opinion of the International Searching Authority dated Feb. 27, 2020 for International Patent Application No. PCT/EP2020/050009 (5 pages in German with English Translation).
International Preliminary Report on Patentability dated Jun. 16, 2021 for International Patent Application No. PCT/EP2020/050009 (6 pages in German with English Translation).
Wikipedia https://de.wikipedia.org/wiki/Partikelgr%C3%B6%C3%9Fenverteilung "Partikelgrößenverteilung (Particle Size Distribution)" accessed Jun. 16, 2020 (14 pgs. with English Translation).
Tuenter, G. et al. Kinetics and Mechanism of the NOx Reduction with $NH_3$ on $V_2O_5$-$WO_3$-$TIO_2$ Catalyst. Ind. Eng. Chem. Prod. Res. Dev. 1986. vol. 25, pp. 633-636.
Kasaoka, S. et al., Effect of Inlet NO/NO2 Molar Ratio and Contribution of Oxygen in the Catalytic Reduction of Nitrogen Oxides with Ammonia. Nippon Kagaku Kaishi 1978, vol. 6, pp. 874-881.
Avila, P., et al., Catalyst for NOx Removal in Nitric-Acid Plant Gaseous Effluents. Atmospheric Environment.1993, vol. 27A, pp. 443-447.
Maricq, M.M., et al., Particulate Emissions from a Direct-Injection Spark-Ignition (DISI) Engine. SAE, 1999-01-1530, 1999, pp. 1-9.
Hall, D.E., et al., Measurement of the Number of Size Distribution of Particles Emitted from a Gasoline Direct Injection Vehicle. SAE. 1999-01-3530. pp. 1-11.
Mathis. U., et al., TEM analysis of volatile nanoparticles from particle trap equipped diesel and direct-injection spark-ignition vehicles. Atmospheric Environment. vol. 38, pp. 4347-4355.
Von Johann Siebler, et al. MTZ Motortechnische Zeitschrift [Katalysatorprufung] 1994, 55, pp. 214-218.
Hagelüken, C. Autoabgaskatalysatoren, Grundlagen—Herstellung—Entwicklung—Recycling—Okologie, Christian Hagelüken, 2nd edition, 2005, p. 62.
DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberflöche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
Hinds, W.C. Aerosol technology: Properties, behavior and measurement of airborne particles. Wiley, $2^{nd}$ edition, 1999, 200 Pages.
Mayer, T. Feststoff-SCR-System auf Basis von Ammoniumcarbamat [Solid SCR system based on ammonium carbamate], dissertation, Technical University of Kaiserslautern, 2005 (161 Pages).

\* cited by examiner

Fig. 4a: Pattern 1

Fig. 4b: Pattern 2

Fig. 4c: Pattern 3

Fig. 4d: Pattern 4

METHOD FOR PRODUCING CATALYTICALLY ACTIVE WALL FLOW FILTERS

The present invention relates to a method for producing particle filters. Particle filters are commonly used for filtering exhaust gases from a combustion process. The invention also relates to novel filter substrates and their specific use in exhaust gas aftertreatment.

The exhaust gas of e.g. combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of soot residues and possibly adherent organic agglomerates. These are called primary emissions. CO, HC, and particles are the products of the incomplete combustion of the fuel inside the combustion chamber of the engine. Nitrogen oxides form in the cylinder from nitrogen and oxygen in the intake air when the combustion temperatures locally exceed 1400° C. Sulfur oxides result from the combustion of organic sulfur compounds, small amounts of which are always present in non-synthetic fuels. For the removal of these emissions, which are harmful to health and environment, from the exhaust gases of motor vehicles, a variety of catalytic technologies for the purification of exhaust gases has been developed, the fundamental principle of which is usually based upon guiding the exhaust gas that needs purification over a catalyst consisting of a flow-through or wall flow honeycomb structure (wall flow filter) and/or a catalytically active coating applied thereupon and/or therein. The catalyst promotes the chemical reaction of various exhaust gas components to form harmless products, such as carbon dioxide and water, and at the same time removes the fine soot particles in the case of a wall flow filter.

Particles may be very effectively removed from the exhaust gas with the aid of particle filters. Wall flow filters made of ceramic materials have proved particularly successful. These have two end faces and are constructed from a plurality of parallel channels of a certain length, which are formed by porous walls and which extend from one end face to the other. The channels are alternately sealed in a gas-tight manner at one of the two ends of the filter so that first channels are formed that are open at the first side of the filter and sealed at the second side of the filter, and second channels are formed that are sealed at the first side of the filter and open at the second side of the filter. In accordance with the arrangement of the filter in the exhaust gas flow, one of the end surfaces here forms the inlet end surface and the second end surface forms the outlet end surface for the exhaust gas. The flow channels that are open at the inlet side form the inlet channels, and the flow channels that are open at the outlet side form the outlet channels. The exhaust gas flowing into the first channels, for example, may leave the filter again only via the second channels and must flow through the walls between the first and second channels for this purpose. For this purpose, the material from which the wall flow filters are constructed exhibits an open-pored porosity. The particles are retained when the exhaust gas passes through the wall.

Wall flow filters may be catalytically active. The catalytic activity is achieved by coating the filter with a coating suspension which contains the catalytically active material. Contacting the catalytically active materials with the wall flow filter is referred to in the art as "coating". The coating takes on the actual catalytic function and includes storage materials and/or catalytically active metals that are for the most part present by being deposited in a highly dispersed form on temperature-stable metal compounds, in particular metal oxides, with a large surface area. The coating for the most part takes place via the application of an aqueous suspension of the storage materials and catalytically active components—also called a washcoat—onto or into the wall of the wall flow filter. After the application of the suspension, the substrate is generally dried and, if applicable, calcined at increased temperature. The coating may consist of one layer or be made up of multiple layers that are applied atop one another (multi-layered) and/or offset relative to one another (as zones) onto a corresponding filter. The catalytically active material can be applied to the porous walls between the channels (so-called on-wall coating). However, this coating can lead to an unacceptable increase in the back pressure of the filter. With this as the background, JPH01-151706 and WO2005016497A1, for example, propose to coat a wall flow filter with a catalyst such that the latter penetrates through the porous walls (what is known as in-wall coating). A zone is understood to mean the presence of a catalytically active material (coating) on or in the wall of the filter over less than the entire length of the wall flow filter.

So-called three-way catalysts are used for exhaust gas reduction for stoichiometrically burning engines. Three-way catalysts (TWCs) are well known to those skilled in the art and have been required by law since the 1980 s. The actual catalyst mass here consists for the most part of a high-surface, oxidic substrate material, on which the catalytically active components are deposited with the finest distribution. The precious metals of the platinum group, platinum, palladium and/or rhodium are particularly suitable as catalytically active components for cleaning stoichiometrically composed exhaust gases. For example, aluminum oxide, silicon dioxide, titanium oxide, zirconium oxide, cerium oxide and mixed oxides thereof, and zeolites are suitable as substrate materials. What are known as active aluminum oxides having a specific surface (BET surface, measured according to DIN 66132—latest version on the filing date) of more than 10 $m^2/g$ are preferably used. Moreover, three-way catalysts include oxygen-storing components to improve the dynamic conversion. These include cerium/zirconium mixed oxides which are optionally provided with lanthanum oxide, praseodymium oxide and/or yttrium oxide. Meanwhile, zoned and multi-layer systems having three-way activity have also become known (U.S. Pat. Nos. 8,557,204; 8,394,348). If such a three-way catalytic converter is located on or in a particle filter, this is referred to as a cGPF (catalyzed gasoline particle filter; for example EP 2650042B1).

The quality of a catalytically coated exhaust filter is measured according to the criteria of filtration efficiency, catalytic performance and pressure loss. In order to meet these different requirements, filters are provided, for example, with catalytically active zones. As stated, the zones may be present on the walls of the cells or in the porous wall of the filter matrix.

There are two principal groups of manufacturing processes for producing these catalytically active zones. Common to both method groups is that the coating suspension is introduced into the filter by applying a pressure difference, that is to say by the presence of different pressures at the two end faces of the filter. The coating suspension moves in the channels of the filter in the direction of the lower pressure.

In this case, the first group additionally operates with an excess of coating suspension which is brought into the filter substrate by a pressure difference and the excess coating suspension is removed from the channels again by a pressure difference reversal. In the present case, excess coating suspension means that the amount of suspension used for the coating process is significantly above the value which is required for the desired loading of the filter with catalytically active material. The excess of coating suspension can be removed from the filter again by appropriate means, such as a pressure difference reversal. Within the scope of the invention, a pressure difference reversal is understood to mean that a pressure difference present at the respective ends of the wall flow filter is reversed, and consequently its sign changes. This pressure difference reversal therefore acts counter to the original coating direction.

The second group works without a pressure difference reversal and a washcoat excess, i.e. the entire amount of suspension provided and supplied for the coating remains essentially in the substrate, i.e. >97% of the proportion of solids in the coating suspension.

Examples of the prior art are given below with respect to the two groups of coating methods. The first group includes WO06021338A1, which describes a method for coating a wall flow particle filter with a coating composition, wherein the wall flow filter is made of an open-pored material, has a cylindrical shape with length L, and has a plurality of flow channels from an inlet end surface to an outlet end surface, said channels being closed off in alternating fashion. The coating suspension is applied by perpendicularly aligning the flow channels of the wall flow filter such that one end face is located at the bottom and the second end face at the top, by introducing the coating composition into the filter body through the flow channels of the wall flow filter that are open in the lower end face to a desired height above the lower end face by applying a pressure difference and removing excess coating composition downward by applying a suction pulse. The special modifications of the method in WO06042699A1 and WO11098450A1 are based on the same coating principle. A coating apparatus using this method principle is presented in WO13070519A1. Here, too, an excess of coating suspension and the principle of applying the pressure difference reversal are used.

This coating principle is also suitable for producing particle filters which have zones with catalytically active material on the inlet and outlet sides. In WO09103699A1, a method for coating filters with two different washcoats is described, the method steps being that the filter substrate is oriented vertically, a first coating suspension is pumped from below (pressure difference with highest pressure at the lower end), the excess coating suspension removed through suction (pressure difference reversal) and the filter body is filled again from below with the second washcoat after rotation by 180°, and the excess is removed by suction. The filter is dried and calcined after the coating process. The same coating principle is disclosed in U.S. Pat. No. 7,094,728B2.

EP1716903B1 proposes a method for coating filter bodies in which, after coating, the filter is freed of too much of a coating dispersion by immersion in a washcoat suspension by repeatedly applying pressure pulses to one end of the filter body in such a way that excess coating suspension is forced out of the filter body until it has reached its optimum coating weight. Here, too, the objective appears to be, inter alia, the reduction of the exhaust back pressure of the filter. This is clearly in-wall coating.

The methods described in WO06021339A1, WO15145122A2 and WO0110573A2, for example, belong to the second group of coating methods, in which the filter bodies are coated without excess washcoat and without pressure difference reversal. In this case, the perpendicularly oriented filter carrier can be coated with the washcoat from the lower or the upper end face.

WO06021338A1, discloses a method for coating a wall flow particle filter with a coating composition, wherein the particle filter is made of an open-pored material, has a cylindrical shape with length L, and has a plurality of flow channels from an inlet end surface to an outlet end surface, said channels being closed off in alternating fashion. The method is characterized in that the flow channels of the wall flow filter are aligned vertically, so that one end face is located at the bottom and the second end face at the top, the filter is filled by dipping the lower end face of the wall flow filter into a defined, provided amount of the coating composition and by applying a negative pressure to the openings of the outlet channels in the upper end face and sucking the entire quantity of the coating composition into the inlet and outlet channels through the openings of the inlet channels in the lower end face. The amount of coating composition presented is selected according to the desired coating concentration and coating height. There is no pressure difference reversal after the application of the pressure difference for coating. The coating suspension is measured and not used in excess.

WO0110573A2 also describes a method for coating particle filters in which a measured amount of washcoat is applied from below to the filter carrier. By applying a pressure difference (vacuum at the upwardly directed end face), the charged amount of coating suspension is sucked into the channels of the substrate. The substrate is then rotated and the washcoat is distributed to the upper end of the substrate in the channels by the action of an air jet of pressurized air. In this method, there is no reversal of the pressure difference, since the second pressure pulse also points in the same direction as the first one with respect to the movement of the washcoat and thus no pressure difference reversal takes place.

WO15145122A2 is another example of this group of coating methods. In contrast to the methods described above, however, here a predefined amount of coating suspension is applied as measured to the upper end face of the vertically oriented filter and is distributed in the channels of the particle filter by applying a pressure difference (suctioning by applying a vacuum to the lower end face). No further pressure difference reversal takes place after this coating step.

However, there continues to be a need for wall flow filter substrates which are capable of providing optimal performance in the requirement triangle of catalytic activity, filtration efficiency, and exhaust back pressure, particularly in the range of stoichiometrically burning spark ignition engines.

The object of the present invention is to specify a production process for catalytically coated, ceramic wall flux filter substrates, which in particular allows improved wall flux filter substrates to be generated in comparison with the prior art. The wall flow filters produced in this manner should be superior to the substrates correspondingly produced according to the prior art, especially with regard to the requirement of as low an exhaust backpressure as possible with nevertheless sufficient catalytic activity and filtration efficiency. It was also an object of the present invention to specify filter substrates produced by the above process and their use in the exhaust gas aftertreatment.

These and other aims evident from prior art are achieved by a method having the features of claim 1 in question. The dependent claims dependent on these claims relate to preferred embodiments of the method according to the invention. Claims 7-10 are directed to the wall flow filters themselves and their use.

By proceeding, in a method for the production of coated ceramic wall flow filters having at least two catalytically active zones, the wall flow filter having a first end face, a second end face and a length L and a porosity of at least 50% to at most 80% and a mean pore diameter of 5-50 µm, in such a way that the method comprises the following steps:

i) an excess of a first coating suspension is introduced into the first end face by applying a pressure difference via the wall flow filter;

ii) with a pressure difference reversal, an excess of the first coating suspension is removed from the wall flow filter;

iii) a second coating suspension without excess is introduced into the latter via the second end face by applying a pressure difference via the wall flow filter, The solution to the stated aim is attained extremely surprisingly, but in no less advantageous a manner. Surprisingly, it has been found that by combining the two different methods described above to produce at least two identical or different catalytically active zones on a carrier substrate, new wall flow filters can be produced which represent an optimum with regard to filtration efficiency, exhaust back pressure and catalytic activity and can be adapted to the respective requirements of the exhaust system (FIG. 1).

The present invention is based on the combination of two coating methods by means of which a wall flow filter known per se is impinged upon with catalytically active materials and thus coated. Steps i) and ii) belong in some way to a first coating method and step iii) forms the second coating process. In this case, the sequence of the individual method steps is not critical in a first approximation. Thus, for example, step iii) can also be carried out before step i). It is only important that step ii) always takes place after step i), but these steps do not have to be carried out directly one after the other. Step iii) can also be carried out, for example, between steps i) and ii). It should also be mentioned that other intermediate steps not mentioned here, such as, for example, an intermediate drying or calcination or rotation of the substrate, can be carried out within the scope of the invention, provided that the inventive success thereof is not unduly impaired. It should also be mentioned that the coating can be carried out with in each case identical or in each case different catalytically active materials with and without intermediate drying.

In a preferred embodiment of the present invention, it is therefore conceivable that into a vertically locked wall flow filter, a first coating suspension in excess is introduced into the wall flow filter via the first end face by applying a pressure difference via the wall flow filter, and an excess of the first coating suspension is then removed from the wall flow filter. Here, the pressure difference reversal removes said excess coating suspension from the channels of the wall flow filter counter to the coating direction. A second coating suspension is introduced into the wall flow filter without excess via the second end face by applying a pressure difference via the wall flow filter. Drying takes place in each case after the introduction of the second coating suspension. However, it is also preferably possible for intermediate drying to take place before the introduction of the second coating suspension.

In a further preferred embodiment, a first coating suspension is introduced into the vertically locked wall flow filter without excess from a first end face by applying a pressure difference between the end faces of the wall flow filter. A second coating suspension is then introduced into the wall flow filter from a second end face with excess by applying a pressure difference between the end faces of the wall flow filter. Only then, in a step which does not necessarily directly follow, is an excess of second coating suspension removed from the wall flow filter by a pressure difference reversal counter to the coating direction. In turn, a drying step is carried out, wherein drying can optionally also take place after the introduction of the first coating suspension and before the introduction of the second coating suspension.

As already indicated above, it is possible to remove the substrate from the vertical lock between the steps for introducing the respective coating suspension and to rotate it by 180° C. and again lock it. Alternatively, however, this rotation may also be omitted. Particular preference is therefore given to a method as illustrated above in which, in step i), the first coating suspension is introduced into the wall flow filter from the lower, first end face and in step iii), the second coating suspension is introduced into the wall flow filter from the upper, second end face without releasing the wall flow filter from its lock in the interim. Again, step ii) can be carried out directly after step i) or only after step iii). In the latter case, the second coating suspension is simultaneously introduced into the wall flow filter with the pressure difference reversal which occurs (step ii) to remove the excess of coating suspension through step i). Consequently, this leads to a substantially more compact method which can be implemented well and robustly in production.

In the method according to the invention, in a first step i) a suspension comprising catalytically active materials is introduced into the filter, for example via the lower end face of the wall flow filter. For this purpose, the pressure difference which is used for the filling is preferably between 0.05 bar and 4 bar, more preferably between 0.1 and 3 bar and particularly preferably between 0.5 and 2.5 bar. Depending on the viscosity of the suspension and the cell dimensions of the wall flow filter, this pressure difference is preferably selected such that the filling speed in the cells is between 10 mm/s and 250 mm/s, preferably between 20 mm/s and 200 mm/s and very preferably between 30 mm/s and 180 mm/s. The filling of the channels of the wall flow filter with the suspension produces, according to the invention, a coating which constitutes less than the maximum length of the wall flow filter. In this case one speaks of one zone. The zone length may be >15%, more preferably 20%-85%, most preferably 25%-75%, and extremely preferably 30%-70% of the length L of the wall flow filter. In other aspects of the invention, this coating may also extend only up to at least 1.25 cm from the lower end face.

Excess coating suspension is preferably removed in step ii) by applying a pressure pulse with a pressure difference reversal from the channels of the wall flow filter downward, counter to the coating direction. According to the invention, the pressure pulse described in the pressure difference reversal is in particular a measure which is sufficient to largely free the larger ducts or pores (for example Q3 distribution≥d50 of the pore diameter) through the wall from the catalytically active material present above or in said pores.

In the embodiments of the method according to the invention, it is therefore particularly advantageous that in the still moist state of the coating suspension, which was introduced into the wall flow filter by step i), a corresponding pressure pulse according to the invention is set counter to the coating direction (pressure difference reversal) which ensures that the large pores are blocked as little as possible by the coating components of the catalytically active material. Intensive investigations have shown that the volumetric flow of the exhaust gas flowing over the wall of a filter is accomplished in particular by large pores. If a pressure difference is applied to pores, the gas flows laminarly through the pores. The volumetric flow is then proportional to $d^4$. That is to say, 256 times as much gas flows through a 4×larger pore diameter [d]. If these pores are freed of catalytically active material seated on or in the wall by at least one relatively short pressure pulse, the exhaust gas flow can later flow through the wall of the ceramic filter without significantly higher exhaust back pressure. The catalytically active material can continue to be present on the smaller pores, which make up the contribution of the overall porosity of the filter material, without excessively impeding the passing exhaust gas. The substrates produced in this way, in combination with catalytically active coating zones, exhibit good catalytic activity with sufficient filtration efficiency and an exhaust backpressure which is reduced compared with the catalytically active filters of the prior art.

As a rule, the pressure pulse counter to the coating direction (pressure difference reversal) only "blows free" or "sucks free" the large traversing pores or channels which reach through the wall. However, the catalytically active substance remains predominantly present on or in the smaller pores of the filter walls. For further discrimination between large and smaller pores, it may preferably be beneficial for the pressure pulse to come to full deployment in a relatively short period of time. The maximum pressure difference should be achieved within the order of ≤0.5 s, more preferably at least ≤0.2 s and most preferably ≤0.1 s. The pressure pulse during the pressure difference reversal should not exceed 400 mbar, more preferably 370 mbar and very preferably 350 mbar, since otherwise too much of the excess coating suspension is removed. A lower limit is commonly based on the fact that opening of the large pores takes place at all. The lower limit is therefore preferably at least 100 mbar, more preferably at least 120 mbar and very preferably at least 150 mbar. It should be noted that the conditions for the pressure pulse represent a pressure difference which is applied via the wall flow filter from a first end face to a second end face. The person skilled in the art knows how this can be achieved in terms of equipment. An optimal balance between exhaust back pressure, filtration efficiency and catalytic activity of the wall flow filter is achieved by the large pores in particular being purged/cleared under suction.

It has been found to be advantageous if a pressureless holding time is incorporated before the pressure pulse is applied during the pressure difference reversal. The holding time can be adapted depending on the properties of the wall flow filter (porosity, wettability, water absorption capacity, etc.). The holding time is preferably between 0 s and 10 s, more preferably between 0 s and 5 s and particularly preferably between 0 and 2 s.

The method according to the invention can be used both for the production of on-wall coatings and in-wall coatings. In the case of on-wall coatings, as much of the catalytic coating as possible is located on the wall and not in the pores of the wall. Accordingly, it is preferred if the solid constituents of the suspension that can penetrate into the wall of the filter are less than 20% by weight, more preferably less than 15% by weight, and very preferably less than 10% by weight based on the amount of solid constituents. In the case of in-wall coatings, on the other hand, the suspension is in the pores of the wall of a wall flow filter to a large proportion of >80% by weight, more preferably >90% by weight and very preferably >95% by weight and more. Scanning electron microscope images are evaluated with the aid of a statistical gray scale evaluation in order to determine the proportion of washcoat in the wall of the wall flow filter and the proportion of washcoat on the wall of the wall flow filter. In this case, free pores/air appear black in a catalytically coated filter, while the heaviest elements appear to be white. By suitable selection of the measurement settings known to the person skilled in the art, the difference between active mass and filter substrate can be evaluated in this way on the basis of the separation of the grayscale.

The different behavior of the respective coating suspension is controlled very decisively by the particle size distribution of the solid particles in the suspension. On-wall coatings are preferably achieved in that the catalytically active material contains high-surface metal compounds, in particular oxides, whose average particle diameter (DIN 66160—latest version on the filing date) d50 of the Q3 distribution in relation to the average pore diameter of the filter d50 of the Q3 distribution is preferably >1:6 and >1:1 and particularly preferably >1:3 and >1:2 (https://de.wikipedia.org/wiki/Partikelgr%C3%B6%C3%9Fenverteilung). An upper limit commonly forms the value to be estimated by the person skilled in the art as reasonable for corresponding on-wall coatings. By proper selection of the mean particle separation, it is possible to control how much of the catalytically active materials should be positioned in the wall or on the wall of the wall flow filter. The smaller the particle diameters of the metal oxide components that are advantageously stable at high temperatures, the larger the amount of these components that can be positioned in the small pores of the wall. For an in-wall coating, the particle diameter d99 of the Q3 distribution in the suspension should preferably be <0.6:1, more preferably <0.5:1 and particularly preferably <0.4:1 in relation to the average pore diameter of the pores in the filter walls (d50 of the Q3 distribution). This then makes it possible to produce wall flow filters which are shown, for example, in FIG. 5.

Figure 3:
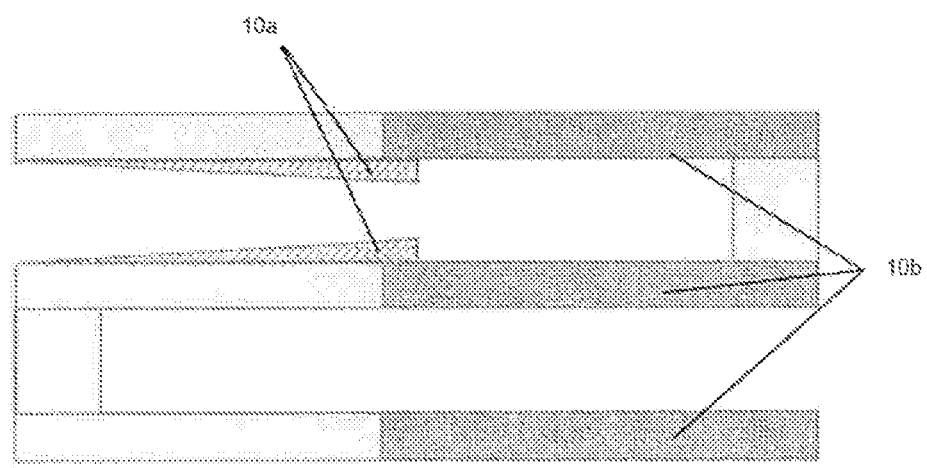

In an advantageous embodiment of the present invention, the catalytic coating of the wall flow filter produced in steps i) and ii) has a positive gradient for the amount of catalytically active material in the coating direction. This means that fewer catalytically active materials are present in the vicinity of the end face via which the coating suspension has been introduced into the wall flow filter after step ii) than is observed further towards the middle of the wall flow filter in the longitudinal direction (FIGS. 3, 10*a*). It is particularly advantageous that an application zone thus produced according to the invention has an amount distribution of catalytic material, measured in the material/length unit so that, after removal of the plugs over a range of e.g. 15 to 40 mm from the coating inlet end, from 20% by weight to 70% by weight less is contained than in a subsequent coated region of the zone. Preferably, the amount of active components has a positive concentration gradient in the range of 20% to 100%, more preferably 25% to 90% in the coating direction on an e.g. 80 mm length of the substrate. The concentration gradient due to the different amount and distribution of the catalytically active materials can be determined gravimetrically, for example, by evaluating X-ray absorption data (XRF measurement) or by measuring the BET surface area of certain filter sections along the longitudinal axis of the filter.

Figure 4:
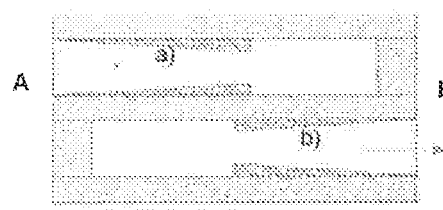
Figure 4:
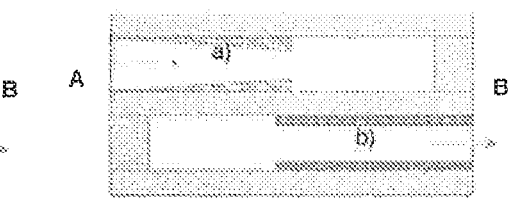
Figure 4:
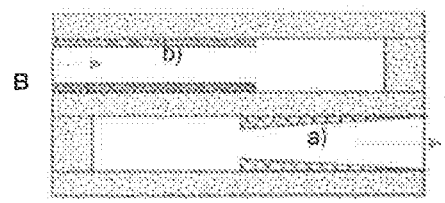
Figure 4:
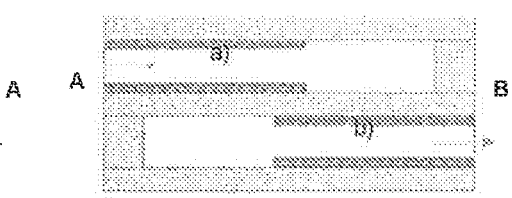

In a further preferred embodiment of the present invention, a method as previously described (steps i) and ii)) is carried out. In addition, without rotating the wall flow filter in its orientation, during said method or subsequently—with or without intermediate drying—a certain amount of a suspension comprising a catalytically active material (identical or different from the first) is applied to the upper end face and is introduced into the vertically locked wall flow filter by applying a pressure increase at the upper end face and/or pressure reduction at the lower end face (pressure difference) of the wall flow filter, so that this coating extends to less than 100% of the length of the wall flow filter (step iii)). The length of this zone coating in the channels adjacent to the first coating can be determined by the person skilled in the art. It is at least 20% and not more than 95% of the length L of the wall flow filter. Preferably from 40% to 85%, particularly preferably from 50% to 70%. A possible embodiment is depicted in FIG. 4.

Another possibility of carrying out this method principle described above would be, for example, to orient the filter vertically, in step U to fill it from below with a pressure difference with excess washcoat to a certain coating length, to remove excess washcoat via pressure difference reversal (step ii), to rotate the filter by 180° and then to immerse the lower end face in a predefined quantity of coating suspension and fill it with a pressure difference while applying a vacuum to the upper end face with the suspension in the second channels (step iii).

Figure 2:
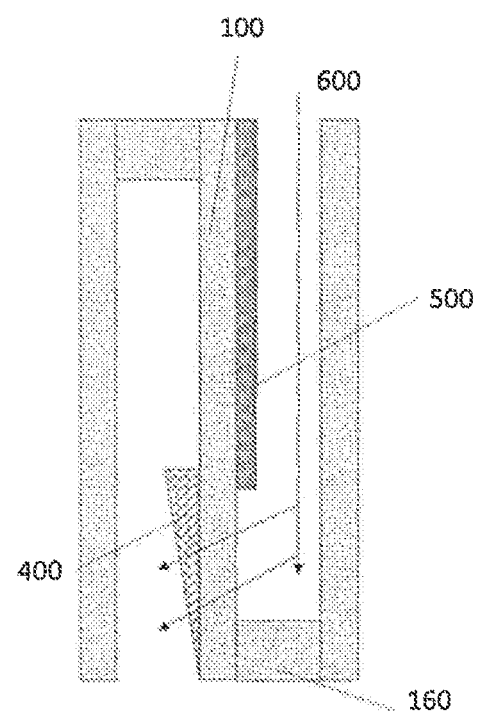

With the method combination described above, particle filters with catalytically active zones can be produced in the inlet and outlet channels as in the examples shown in FIGS. 2 and 3. The two zones (10a, 10b) do not have to overlap. Consequently, a range of at most 20%, preferably at most 10% and very preferably at most 5% of the length L of the wall flow filter can remain free—if desired. However, the coatings preferably overlap at least 5%, more preferably up to 20% and very preferably 7%-15% of the length L of the wall flow filter. The filtration efficiency of the filter as a whole and in particular of the free region can then be specifically adapted after drying to the requirements of the wall flow filter by a subsequent powder coating. The powder coating for increasing the filtration efficiency is known to the person skilled in the art from the filtering technique under the term precoat (e.g. U.S. Ser. No. 44/010,013).

As already indicated, in a further advantageous embodiment of the present invention, the process steps i)-iii) according to the invention can be connected in such a way that with the vertically oriented wall flow filter substrate, the introduction of the suspension from the upper end face and the treatment of the coating after step i) with the at least one pressure pulse occur simultaneously. Here, by means of the at least one pressure pulse used to treat the coating supplied from below, the suspension applied to the upper end face of the wall flow filter at the top is also sucked or pressed into the wall flow filter at the same time. This is therefore done stepwise in such a way that first the suspension is introduced from below into the wall flow filter, then the suspension is applied to the upper end face, and then both suspensions are treated with the at least one pressure pulse. This leads to a particularly preferred method, but in this way two identical or different coatings can be introduced into the wall flow filter from different ends of the wall flow filter with just a small number of steps. As a result, filter architectures of FIG. 4 can be obtained, for example.

As already stated, in general terms, the suspensions applied from the bottom or the top may be the same or different. It is optionally possible to dimension both the first applied coating and the second applied coating as an on-wall coating or as an in-wall coating. In this connection, the following combinations of catalytically active coatings in the wall flow filter are particularly preferred (E=inlet side, A=outlet side in the exhaust gas flow direction):

| Type of coating | E inlet | A outlet |
|---|---|---|
| On-wall/on-wall | SCR coating | ASC coating |
| On-wall/on-wall | TWC coating | TWC coating |
| On-wall/in-wall | SCR coating | ASC coating |
| On-wall/in-wall | TWC coating | TWC coating |
| In-wall/on-wall | SCR coating | ASC coating |
| In-wall/on-wall | TWC coating | TWC coating |
| In-wall/in-wall | SCR coating | ASC coating |
| In-wall/in-wall | TWC coating | TWC coating |
| In-wall/in-wall | SCR coating | SCR coating |

The present invention also relates to a catalytically coated ceramic wall flow filter produced according to the invention for the treatment of exhaust gases of a combustion process. Further advantageous embodiments for the method just described also apply to the wall flow filter specified here, provided that these influence the spatial-physical configuration of the filter.

As described, a very preferred wall flow filter has a catalytically active coating in the channels, of which at least one coating is a porous on-wall coating with a gradient of the washcoat concentration from the end face (for example FIG. 4/5). In this form, the filter has no preferred direction. However, it is preferably installed in the exhaust gas system of a stoichiometrically operated internal combustion engine such that the coating produced by coating with excess suspension and pressure difference reversal (steps i) and ii)) is located in the outlet channel when viewed in the flow direction (FIG. 1).

With the catalytically active wall flow filter according to the invention, the catalytically active coating of the filter can be selected from the group consisting of three-way catalyst, SCR catalyst, nitrogen oxide storage catalyst, oxidation catalyst, soot-ignition coating, hydrocarbon storage. The catalytically active coatings used can be located in the pores and/or on the surfaces of the channel walls of the filter.

In a final aspect, the present invention also relates to the use of the filter according to the invention in a method for oxidizing hydrocarbons and/or carbon monoxide and/or in a method for reducing nitrogen oxide originating from a combustion process, preferably that of an automobile engine. The filter according to the invention is particularly preferably used in exhaust systems of an internal combustion engine as SDPF (SCR catalyst coated on a wall flow filter) cGPF (3-way catalyst coated on a wall flow filter), NDPF (NOx trap catalyst coated on a wall flow filter) or cDPF (diesel oxidation catalyst coated on a wall flow filter).

A further application is the removal of nitrogen oxides from lean exhaust gas mixtures by means of the SCR method. For this SCR treatment of the preferably lean exhaust gas, ammonia or an ammonia precursor compound is injected into the exhaust gas and both are conducted over an SCR-catalytically coated wall flow filter according to the invention. The temperature above the SCR filter should be between 150° C. and 500° C., preferably between 200° C. and 400° C. or between 180° C. and 380° C. so that reduction can take place as completely as possible. A temperature range of 225° C. to 350° C. for the reduction is particularly preferred. Furthermore, optimum nitrogen oxide conversions are only achieved when there is a molar ratio of nitrogen monoxide to nitrogen dioxide ($NO/NO_2=1$) or the $NO_2/NOx$ ratio=0.5 (G. Tuenter et al., Ind. Eng. Chem. Prod. Res. Dev. 1986, 25, 633-636; EP1147801B1; DE2832002A1; Kasaoka et al., Nippon Kagaku Kaishi (1978), 6, 874-881; Avila et al., Atmospheric Environment (1993), 27A, 443-447). Optimum conversions starting at 75% conversion are already achieved at 250° C. with simultaneous optimum selectivity with respect to nitrogen in accordance with the stoichiometry of the reaction equation

only with a $NO_2/NOx$ ratio of around 0.5. This applies not only to SCR catalysts based on metal-exchanged zeolites but to all common, i.e., commercially available, SCR catalysts (so-called fast SCRs). A corresponding $NO:NO_2$ content may be achieved with oxidation catalysts positioned upstream of the SCR catalyst.

The injection devices used can be selected arbitrarily by the person skilled in the art. Suitable systems can be found in the literature (T. Mayer, Feststoff-SCR-System auf Basis von Ammoniumcarbamat [Solid SCR system based on ammonium carbamate], dissertation, Technical University of Kaiserslautern, 2005). The ammonia can be introduced into the exhaust gas stream via the injection device as such or in the form of a compound which produces ammonia under ambient conditions. Suitable compounds are, inter alia, aqueous solutions of urea or ammonium formate, as well as solid ammonium carbamate. These can be taken from a provided source known per se to the person skilled in the art and can be added to the exhaust gas stream in a suitable manner. The person skilled in the art particularly preferably uses injection nozzles (EP0311758A1). By means of these, the optimum ratio of $NH_3/NOx$ is adjusted so that the nitrogen oxides can be converted into $N_2$ as completely as possible.

Wall flow filters having an SCR-catalytic function are referred to as SDPF. These catalysts frequently possess a function for storing ammonia and a function whereby nitrogen oxides can react with ammonia to form harmless nitrogen. An $NH_3$ storing SCR catalyst can be designed in accordance with types known to the person skilled in the art. In the present case, this is a wall flow filter which is coated with a material that is catalytically active for the SCR reaction and in which the catalytically active material, commonly called the "washcoat," is present in the pores of the wall flow filter. However, along with the—in the proper sense of the term—'catalytically active' component, this wall flow filter may also contain other materials, such as binders consisting of transition metal oxides, and large-surface carrier oxides, such as titanium oxide, aluminum oxide, in particular gamma-$Al_2O_3$, zirconium oxide, or cerium oxide. Also suitable as SCR catalysts are those that are made up of one of the materials listed below. However, it is also possible to use zoned or multilayer arrangements or even arrangements consisting of a plurality of components one behind the other (preferably two or three components) with the same materials as the SCR component or different materials. Mixtures of different materials on a substrate are also conceivable.

The actual catalytically active material used in this regard according to the invention is preferably selected from the group of transition-metal-exchanged zeolites or zeolite-like materials (zeotypes). Such compounds are sufficiently familiar to the person skilled in the art. Preferred in this regard are materials from the group consisting of levynite, AEI, KFI, chabazite, SAPO-34, ALPO-34, zeolite β and ZSM-5. Zeolites or zeolite-like materials of the chabazite type, in particular CHA or SAPO-34, as well as LEV or AEI are particularly preferred. In order to ensure sufficient activity, these materials are preferably provided with transition metals from the group consisting of iron, copper, manganese, and silver. It should be mentioned in this respect that copper is especially advantageous. The ratio of metal to framework aluminum or, in the case of SAPO-34, the ratio of metal to framework silicon is normally between 0.3 and 0.6, preferably 0.4 to 0.5. The person skilled in the art knows how to equip the zeolites or the zeolite-like materials with the transition metals (EP0324082A1, WO1309270711A1, WO2012175409A1, and the literature cited therein) in order to be able to deliver good activity with respect to the reduction of nitrogen oxides with ammonia. Furthermore, vanadium compounds, cerium oxides, cerium/zirconium mixed oxides, titanium oxide, and tungsten-containing compounds, and mixtures thereof can also be used as catalytically active material.

Materials which in addition have proven themselves to be advantageous for the application of storing $NH_3$ are known to the person skilled in the art (US20060010857A1, WO2004076829A1). In particular, microporous solid materials, such as so-called molecular sieves, are used as storage materials. Such compounds, selected from the group consisting of zeolites, such as mordenites (MOR), Y-zeolites (FAU), ZSM-5 (MFI), ferrierites (FER), chabazites (CHA), and other "small pore zeolites," such as LEV, AEI, or KFI, and β-zeolites (BEA), as well as zeolite-like materials, such as aluminum phosphate (AlPO) and silicon aluminum phosphate SAPO or mixtures thereof, can be used (EP0324082A1). Particularly preferably used are ZSM-5 (MFI), chabazites (CHA), ferrierites (FER), ALPO- or SAPO-34, and β-zeolites (BEA), Especially preferably used are CHA, BEA, and AlPO-34 or SAPO-34. Extremely preferably used are materials of the LEV or CHA type, and here maximally preferably CHA or LEV or AEI. Insofar as a zeolite or a zeolite-like compound as just mentioned above is used as catalytically active material in the SCR catalyst, the addition of further $NH_3$-storing materials can, advantageously, naturally be dispensed with. Overall, the storage capacity of the ammonia-storing components used can, in a fresh state at a measuring temperature of 200° C., be more than 0.9 g $NH_3$ per liter of catalyst volume, preferably between 0.9 g and 2.5 g $NH_3$ per liter of catalyst volume, and particularly preferably between 1.2 g and 2.0 g $NH_3$/liter of catalyst volume, and very particularly preferably between 1.5 g and 1.8 g $NH_3$/liter of catalyst volume. The ammonia-storing capacity can be determined using synthesis gas equipment. To this end, the catalyst is first conditioned at 600° C. with NO-containing synthesis gas to fully remove ammonia residues in the drilling core. After the gas has been cooled to 200° C., ammonia is then metered into the synthesis gas at a space velocity of, for example, 30,000 $h^{-1}$ until the ammonia storage in the drilling core is completely filled, and the ammonia concentration measured downstream of the drilling core corresponds to the starting concentration. The ammonia-storing capacity results from the difference between the amount of ammonia metered overall and the amount of ammonia measured on the downstream side based on the catalyst volume. The synthesis gas is here typically composed of 450 ppm $NH_3$, 5% oxygen, 5% water, and nitrogen.

Besides an SCR zone, the wall flow filter according to the invention may also include a downstream-positioned zone with an ammonia-oxidation catalyst(s), also referred to as ammonia slip catalysts ("ASC"), to oxidize excess ammonia and prevent it from being released into the atmosphere. In some embodiments, the ASC may be mixed with an SCR catalyst. In certain embodiments, the ammonia oxidation catalyst material may be selected such that it facilitates oxidation of ammonia instead of NOx or $N_2O$ formation. Preferred catalyst materials comprise platinum, palladium, or a combination thereof. The ammonia oxidation catalyst may include platinum and/or palladium supported on a metal oxide(s). In some embodiments, the catalyst is disposed on a large surface area substrate including, but not limited to, alumina.

In some embodiments, the ammonia oxidation catalyst comprises a platinum group metal on a silicon-containing substrate. A silicon-containing material may comprise a material such as: (1) silicon dioxide, (2) a zeolite having a silica to alumina ratio of at least 200, and (3) amorphous silica-doped alumina having an $SiO_2$ content of >40%. In some embodiments, a platinum group metal is present on the substrate in an amount of about 0.1% by weight up to about 10% by weight of the total weight of the platinum group metal and the substrate. Preferred materials for ASCs can be found, for example, in WO 2018183457A1, WO 2018141887A1, WO 2018081247A1.

Very particular preference is given to the use of the wall flow filter according to the invention in a method for the simultaneous oxidation of hydrocarbons and carbon monoxide and in a process for reducing nitrogen oxide. This process is preferably that which takes place in a three-way catalyst in the stoichiometric exhaust gas. It is preferred if, in addition to this wall flow filter, there is also a downstream or upstream three-way catalyst in the exhaust system. Optionally there are also 2 separate three-way catalysts, particularly preferably one upstream and one downstream of the wall flow filter according to the invention in the exhaust gas system. The wall flow filter is very particularly preferably used as a cGPF with three-way function.

Wall flow filters with a catalytic activity that eliminates nitrogen oxides and hydrocarbons and carbon monoxide (HC, CO, and NOx) in the stoichiometric exhaust gas ($\lambda=1$ conditions) are usually referred to as catalyzed gasoline particle filters (cGPF). In addition, they can convert the oxides of the nitrogen under rich exhaust gas conditions and CO and HC under lean conditions. For the most part, the coatings considered here contain platinum group metals, such as Pt, Pd, and Rh, as catalytically active components, wherein Pd and Rh are particularly preferred. The catalytically active metals are often deposited with high dispersion on large-surface oxides of aluminum, cerium, zirconium, and titanium, or mixtures thereof, which may be stabilized by additional transition elements, such as lanthanum, yttrium, praseodymium, etc. Such three-way catalysts also contain oxygen-storing materials (for example, Ce/Zr mixed oxides; see below). For example, a suitable three-way catalytic coating is described in EP1181970B1, EP1541220B1, WO2008113445A1, WO2008000449A2, to which reference is hereby made with regard to the use of catalytically active powders.

The requirements applicable to gasoline particle filters (cGPF) differ significantly from the requirements applicable to diesel particle filters (cDPF). Diesel engines without DPF can have up to ten times higher particle emissions, based on the particle mass, than gasoline engines without GPF (Maricq et al., SAE 1999-01-01530). In addition, there are significantly fewer primary particles in the case of gasoline engines, and the secondary particles (agglomerates) are significantly smaller than in diesel engines. Emissions from gasoline engines range from particle sizes of less than 200 nm (Hall et al., SAE 1999-01-3530) to 400 nm (Mathis et al., Atmospheric Environment 38 4347) with a maximum in the range of around 60 nm to 80 nm. Due to their low particle relaxation time, small particles follow flowlines with almost no inertia, A random "trembling movement" is superimposed on this uniform, convection-driven movement. For this reason, the nanoparticles in the case of GPF must mainly be filtered by diffusion separation. For particles smaller than 300 nm, separation by diffusion (Brownian molecular motion) and electrostatic forces becomes more and more important with decreasing size (Hinds, W.: Aerosol technology: Properties and behavior and measurement of airborne particles, Wiley, 2nd edition 1999). For this reason, particular optimization with respect to filtration efficiency at low exhaust back pressure is particularly important, especially in the case of a cGPF.

Various catalytic functions may also be combined with one another. The three-way catalysts just mentioned may, for example, be equipped with a nitrogen oxide storage functionality (TWNSC). As stated above, these catalysts consist of materials that, under stoichiometric exhaust-gas conditions, impart to the catalyst the function of a three-way catalyst, and that have a function for the storage of nitrogen oxides under lean exhaust-gas conditions. These stored nitrogen oxides are regenerated during brief rich operating phases in order to restore storage capability. The manufacturing of a corresponding TWNSC preferably takes place by assembling materials that are used for the construction of a three-way catalyst and a nitrogen oxide storage catalyst. A particularly preferred embodiment of such a catalyst is described in WO2010097146A1 or WO2015143191A1, for example. However, during the regeneration, an air/fuel mixture is preferably maintained which corresponds to a $\lambda$ of 0.8 to 1. This value lies particularly preferably between 0.85 and 0.99, and very particularly preferably between 0.95 and 0.99.

All ceramic materials customary in the prior art can be used as wall flow monoliths or wall flow filters. Porous wall flow filter substrates made of cordierite, silicon carbide, or aluminum titanate are preferably used. These wall flow filter substrates have inflow and outflow channels, wherein the respective downstream ends of the inflow channels and the upstream ends of the outflow channels are alternately closed off with gas-tight "plugs." In this case, the exhaust gas that is to be purified and that flows through the filter substrate is forced to pass through the porous wall between the inflow channel and outflow channel, which delivers an excellent particle filtering effect. The filters may be symmetrical or asymmetrical. This means that the inflow channels are either just as large as the outflow channels or else the inflow channels are larger than the outflow channels, i.e., they have a larger so-called "open frontal area" (OFA) than the outflow channels. The filtration property for particulates can be designed by means of porosity, pore/radii distribution, and thickness of the wall. The open porosity of the uncoated wall flow filters is typically more than 50% up to a maximum of 80%, generally from 50% to 75%, particularly from 50% to 70% [measured according to DIN 66133, latest version on the filing date]. The average pore diameter d50 of the uncoated filters is at least 5 µm, for example from 7 µm to 35 µm, preferably more than 10 µm, in particular more preferably from 10 µm to 25 µm or very preferably from 15 µm to 20 µm [measured according to DIN 66134, latest version on the filing date]. The completed filters having a mean pore diameter (d50) of typically 10 µm to 25 µm and a porosity of 50% to 65% are particularly preferred.

Each of the known production methods for applying the catalytic coating described above as prior art has advantages and disadvantages in so-called in-wall coatings or on-wall coatings in the filter, generally depending on which zone is located on the input side or output side of the filter in the exhaust air flow. In principle, the zone in the wall of the filter, irrespective of the group of processes by which it is produced, has poor filtration properties and poor performance but a very low pressure loss. The method with reversal of the pressure difference and with excess coating suspension during coating (group 1) has an average catalytic performance, an average filtration efficiency and an average pressure loss in application zones. The process without reversal of the pressure difference and without excess of coating suspension during coating (group 2) has good catalytic performance and filtration efficiency in application zones, but has a very high pressure loss.

The wall flow filter according to the invention considered here has obtained its decisive character by the type and manner of coating. The starting point is a catalytic coating applied in special form to the filter, which is made porous by the application of a pressure pulse counter to the coating direction (pressure difference reversal) and therefore has a desired high permeability. This coating is combined with a coating which is embodied in the adjacent channels as an in-wall or on-wall coating, which has not been subjected to a pressure difference reversal. This filter produced by combining the two coating variants has surprising advantages over coated wall flow filters which were produced only according to one of the coating principles shown. In particular, optimized particle filters can be produced with such embodiments according to the invention, which can be tailored precisely to the respective application purpose or the respective exhaust gas problem. Against the background of the known prior art, this was not to be expected.

FIGURES

FIG. 1 shows by way of example the effect of different combinations of the different coating architectures on the basis of Pattern 1 (top)-4 (below). With regard to their effect in the exhaust gas flow. The combination of two coatings with high permeability has the lowest pressure loss, but is otherwise weaker in filtration efficiency, light-off temperature and OSC (oxygen storage) than the other patterns of the present invention. The combination of two coatings with low permeability shows very good values with regard to light-off temperature, OSC and filtration efficiency, but results in an enormous increase in pressure. The best combination of all features (pressure loss, filtration efficiency, light-off temperature and OSC) shows the combination of a low permeability coating in the input cell (inlet side of the filter in the exhaust gas; E) with a porous coating according to the invention with a high permeability in the starting cell (outlet side of the filter in the exhaust gas; A). The optimum setting of the two zone lengths depends on the requirements of the respective motor. The quality criteria of the coated filter can thus be adjusted via the zone length as with a slide controller.

FIG. 2 shows schematically the product with two application zones resulting from the combination of the coating methods. On the porous basic matrix of the filter 100 with the plug 160 is a porous coating 400, also termed a filter cake, with a high permeability, produced by the coating from below with an excess and a pressure difference reversal, and a low-porosity coating 500 with a low permeability, produced by the coating from above without pressure difference reversal. The exhaust gas 600 flows over the coating 500 and flows through the porous matrix of the filter 100 and the open-porous coating 400. After the flow, the layer 400 is also overflowed.

FIG. 3 relates to the combination of an on-wall coating (10a) produced according to the invention and an additional in-wall coating (10b) coming from the other side. The preferred embodiment with an overlap is shown.

Figure 5:
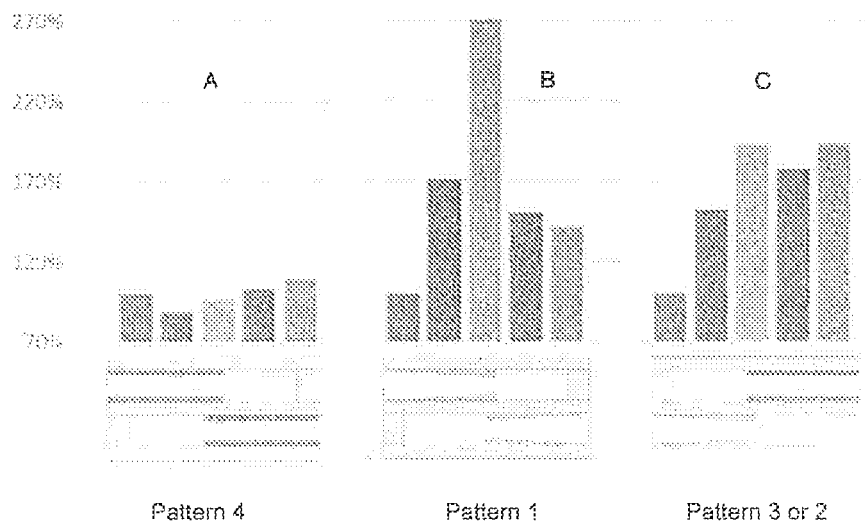

FIG. 4 The figures show four exemplary embodiments of Pattern 1 to Pattern 4 from the experimental part FIG. 5 shows the coating concentration along the longitudinal direction of two inventive (Pattern 2 and 3 respectively) and two non-inventive wall flow filters (Pattern 1 and 4). All three variants have in total the same amount of coating as loading. The five disks per variant were shown (standardized) relative to the loading of the first disks on the left. The distribution of the oxide loading over the length of the filter measured via the determination of the BET surface is shown by way of example for various combinations of coatings for two zones on the wall.

Figure 6:
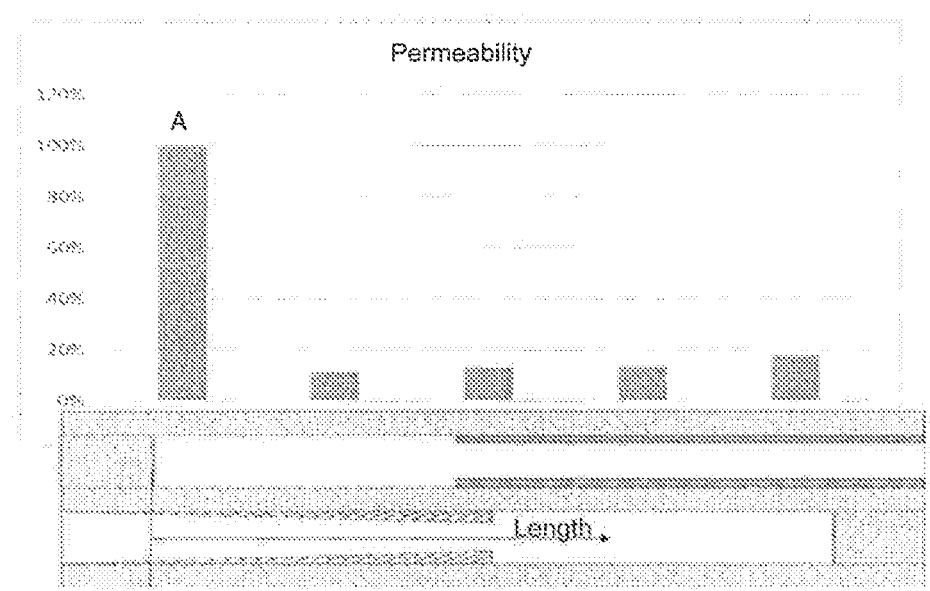

FIG. 6 shows the permeability distribution of two application zones produced according to the invention

EXAMPLES

The exemplary experiments for the preparation of filters with application zones were carried out with the following starting materials.

Filter substrates: Cordierite, 4.66"×4.66"×6.00", 300/8, average pore diameter d50=17.5 μm Noble metal loading: 36 g/ft$^3$ (Pt=0/Pd=30/Rh=6)

Oxide loading: 100 g/L

Specification for the particle-column distribution of the on-wall coatings: d50=4.2-5.0 μm, d90=9.0-18 μm Distribution of Washcoat Coating in the Wall Flow Filter:

Since the filter used for pattern production has a volume of 1.68 liters, the oxide loading is 168 g. If only a zone of 80% of the length is applied, the zone for these comparisons contains the 168 g. If two zones with 60% of the length L of the filter are applied, each zone contains 50% of the oxides and thus 84 g of oxide. If a zone with 80% of the substrate length were combined with a zone with 40% of the substrate length, the 80% long zone in this comparison would have ⅔ of the amount of oxide (=112 g) and the 40% long zone would have ⅓ of the amount of oxide (=56 g).

Experimental Part for the Production of the Zoned Outlay Pattern 1-4:

General

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The suspension thus obtained was then mixed with a palladium nitrate solution and a rhodium nitrate solution under constant stirring. The resulting coating suspension (washcoat) was used directly to coat a commercially available wall flow filter substrate.

In the following, the methods for producing products are described which each have two application zones which have been coated by different end faces of the filter and each extend over approximately 60% of the length of the filter. The loading of the finished catalysts is composed of 100 g/L of ceramic oxides and 36 g/cft (=1.27 g/L) of noble metal (ratio of palladium to rhodium 5:1), which at the filter volume of 1.6761 L corresponds to a total oxide loading of 167.6 g/filter and a total noble metal amount of 2.13 g/filter. The ratio of ceramic oxides to noble metals is the same in the washcoat of both zones and constant over the entire filter. The total oxide and noble metal amount is equally divided into the two zones during the coating, as a result of which an oxide amount of 83.55 g and a noble metal amount of 1.07 g are ideally applied in each zone coating step.

Pattern 1 (Non-Inventive)

Both washcoat zones a) and b) of Pattern 1 (FIG. 4a) were produced using the same coating method, the ceramic suspension first being introduced into the filter in excess by applying a pressure difference (pressing from below). The excess of oxides is removed by a pressure difference reversal, i.e., the renewed application of a pressure difference (suction from below) opposite the first.

First, zone a) is coated from the bottom from end face A. For this purpose, the suspension has a solids content of around 33% and is pressed into the substrate until 60% of the substrate length is filled with washcoat from bottom to top. The excess washcoat is removed from the filter with a short suction impulse counter to the coating direction (approx. 330 mbar negative pressure, 1.5 sec). After drying and calcining, the filter is coated from the bottom from the front side B in order to produce zone b). The coating is effected analogously to the coating of zone a), only the coating parameters differ slightly (solids concentration of around 35%, suction pulse negative pressure around 210 mbar, suction pulse duration around 0.5 sec., increase in the suction pulse within 0.2 sec to the maximum). The filter is dried and calcined.

Pattern 2 and Pattern 3 (Inventive)

Pattern 2 (FIG. 4b) and Pattern 3 (FIG. 4c) were produced according to one procedure, the coating of zone a) and zone b) each having a different coating process.

First, zone a) is coated from the bottom from end face A. For this purpose, the suspension has a solids content of around 34% and is pressed into the substrate until 60% of the substrate length is filled with washcoat from bottom to top. The excess washcoat is removed from the filter with a short suction pulse (around 330 mbar negative pressure, 1.5 sec suction pulse duration, rise in the suction pulse within 0.2 sec to maximum). After drying and calcining, the filter is coated from the top from the front side B in order to produce zone b). For this purpose, a measured washcoat quantity (solids content about 44%) is added from above to the front side B and a short suction pulse (250 mbar negative pressure, 3 sec) is applied in order to distribute the washcoat in the filter. The filter is dried and calcined.

Sample 4 (Non-Inventive)

Both washcoat zones a) and b) of Pattern 4 (FIG. 4d) were produced using the same coating method, the ceramic suspension being applied from above to the wall flow filter and brought into the filter by applying a pressure difference (suction from below) (non-inventive).

First, zone a) is coated from the front face A from above. For this purpose, the suspension has a solids content of 43-45% and is added in a metered amount from above to the front side A. A pressure difference in the form of a short suction pulse (250 mbar negative pressure, 1 sec) is applied in order to distribute the washcoat in the filter. After drying and calcining, the filter is coated from the top from the front side B in order to produce zone b). The coating parameters for this are analogous to those for coating zone a). The filter is dried and calcined.

Characterization

The effectiveness of a catalytically active filter is determined by the interaction of the functional groups of catalytic performance, filtration efficiency and exhaust back pressure (backpressure) which essentially result from the distribution of the catalytic material and the permeability of the washcoat layers. The distribution and quantity of the catalytically active material in the flow direction of the filter is determined via a measurement of the BET surface (DIN 66132— latest version on filing date), and the permeability is determined by measuring the back pressure on filter samples of Patterns 1 to 4.

Analysis of the gradient of washcoat distribution and permeability:

The samples for the analyses with respect to the determination of the gradients (determination of the distribution of the catalytic material in the axial longitudinal direction) were prepared after coating and calcination as follows:

Cutting off the filter plugs on both sides (filter shortened by 2×10 mm)

Dividing the residue in the longitudinal direction to 5 equal-length parts (filter disks)

To determine the BET gradient, the 5 disks were ground and analyzed.

For the permeability measurement, a block of 10 mm×10 mm×20 mm (width×depth×height) was sawed out of each disk in the center. Each second channel was clogged alternately to produce a small minifilter. For this minifilter, the pressure loss is measured at an air flow of 6 l/min. The pressure loss is initially set to be proportional to the permeability.

FIG. 5 shows by way of example the differences in washcoat loading (gradients in the disks) between the five filter sections with respect to the BET surface, which result from the use of the different methods a) coating with excess washcoat and changing direction of the pressure difference and b) coating without and only with a low level of washcoat excess without an alternating pressure difference for the combination of the on-wall zones. The suspensions used had identical particle size distributions and identical Pd to oxide ratios. Due to the different methods, the suspensions had different viscosities and different solids concentrations. The gradient was always standardized with the value of the left disk.

All 3 variants (Pattern 1, Pattern 2/3, Pattern 4) have in total the same amount of washcoat as loading. The 5 disks per variant was shown (standardized) relative to the loading of the first disks on the left. Thus, the left disk always has 100%.

In the coating according to the method according to the invention (coating with excess washcoat and changing direction of the pressure difference according to method steps i) to iii)), an increasing gradient results in the coating direction, while a uniform distribution of the catalytic material without gradient results in the coating without pressure difference reversal. The effect of the coating methods on the permeability is shown in FIG. 6 by way of example for Pattern 2.

FIG. 6 shows the course of the permeability by way of example for the combination of two on-wall zones, wherein the left zone was produced with a washcoat excess and a reversal of the pressure difference during the coating according to method steps i) to ii) of the first preferred embodiment of the method, while the right zone was produced without excess washcoat and without reversal of the pressure difference. Both zones contain the same amount of oxides and both cover 60% of the length of the filter.

To determine the permeability, the plugs of the filter were first removed. The remainder was divided into 5 equally long disks approximately 26 mm in length. Small cuboids with a base area of 10 mm×10 mm and a height of 26 mm were in turn produced from the disks. The channels were thus provided with plugs, so that 5 small filter bodies were produced. A pressure difference volume flow curve was now determined for the small filters and the permeability was calculated via the Darcy equation. The left zone was used to standardize the permeability of the five small filters.

The first disk of the zone, hereinafter referred to as region A, which was produced with excess washcoat and a reversal of the pressure difference during coating, has a permeability of 4 to 20 times higher in the first 15 to 50 mm than the zone in the following mm. The length L was measured from the end face after removal of the plugs, which had the first contact with the washcoat in the case of coating with excess washcoat and a reversal of the pressure difference. The zone which was produced without excess washcoat and without reversal of the pressure difference during coating has a permeability which corresponds to only 5% to 25% of the permeability of region A with the same particle size distribution of the oxides in the washcoat and the same amount of oxide in the zone. The same applies to the region of the zone which has been produced with a washcoat excess and a reversal of the pressure difference during the coating, which is further away from the end face than the region A.

Table 1 shows the distribution of the oxides and the resulting permeability in a zone produced from below after process steps i) to iii) (the length measurement starts after the plug). The range 0-26 mm was used for standardization to 100%

TABLE 1

|  | 0 mm-26 mm | 26 mm-52 mm |
|---|---|---|
| Oxide loading | 100% | 132% |
| Permeability | 100% | 12% |

In comparison, table 2 shows the different permeabilities of the coatings from top and bottom (the length measurement starts behind the plug). The range 0-26 mm of the coating from below was set at 100% for standardization.

TABLE 2

|  | Permeability in the first 26 mm behind the plug |
|---|---|
| Coating from bottom | 100% |
| Coating from the top | 16% |

Catalytic characterization of the products:

In the foregoing, after Patterns 1 to 4 have been characterized with respect to the distribution of the catalytic material and the permeability, the catalytic efficiency, filtration efficiency, and exhaust back pressure of the four different patterns are subsequently determined.

The particle filter Patterns 1 to 4 were co-subjected to engine test bench aging. This aging process consists of an overrun cut-off aging process with an exhaust gas temperature of 950° C. before the catalyst inlet (maximum bed temperature of 1030° C.). The aging time was 19 hours (see Motortechnische Zeitschrift, 1994, 55, 214-218).

The catalytically active particle filters were then tested in the aged state at an engine test bench in the so-called "light-off test", in the "lambda sweep test" and in the "OSC test". In the light-off test, the light-off behavior is determined in the case of a stoichiometric exhaust gas composition with a constant average air ratio $\lambda$ ($\lambda=0.999$ with ±3.4% amplitude).

Table 3 below contains the temperatures T70 of Patterns 1 to 4, at which 70% of the considered components are respectively converted.

TABLE 3

| # | T70 HC stoichiometric | T70 CO stoichiometric | T70 NOx stoichiometric |
|---|---|---|---|
| 1 | 403 | 431 | 431 |
| 2 | 401 | 424 | 429 |
| 3 | 396 | 413 | 417 |
| 4 | 392 | 406 | 409 |

The dynamic conversion behavior of the particle filters was determined in a lambda sweep test in a range from $\lambda=0.99-1.01$ at a constant temperature of 510° C. The amplitude of $\lambda$ in this case was ±3.4%. Table 2 shows the conversion of Patterns 1 to 4 at the intersection of the CO and NOx conversion curves, along with the associated HC conversion of the aged particle filters.

TABLE 4

| # | CO/NOx conversion at the intersection | HC conversion at the CO/NOx intersection |
|---|---|---|
| 1 | 95% | 96% |
| 2 | 95% | 96% |
| 3 | 96% | 97% |
| 4 | 96% | 96% |

The particle filter Pattern 2 shows a slight improvement in light-off behavior compared to Pattern 1 in the aged state. The particle filters of Patterns 3 and 4 show a marked improvement in light-off behavior and dynamic CO/NOx conversion in the aged state compared with Pattern 1.

In order to calculate the oxygen storage capacity of the particle filters in mg/L, the particle filter was placed between two lambda probes and the time offset of the two sensor signals was measured during a jump test (OSC test) with lambda jumps of $\lambda=0.96-1.04$ (Autoabgaskatalysatoren, Grundlagen—Herstellung—Entwicklung—Recycling—Okologie, Christian Hagelüken, 2nd edition, 2005, p. 62). Table 5 shows the results of the OSC tests of Patterns 1 to 4.

TABLE 5

| # | OSC [mg/L] |
|---|---|
| 1 | 159 |
| 2 | 166 |
| 3 | 199 |
| 4 | 196 |

Patterns 3 and 4 show a markedly increased oxygen storage capacity after aging compared to Pattern 1.

The particle filters in Patterns 1 to 4 were compared at a cold blow test bench with respect to the exhaust back pressure.

Table 6 below shows pressure loss data which were determined at an air temperature of 21° C. and a volume flow rate of 300 m³/h.

TABLE 6

| # | bp @ 300 m3/h | bp @ 300 m3/h (relative to #1) |
|---|---|---|
| 1 | 28.8 mbar | — |
| 2 | 43.2 mbar | +50% |
| 3 | 40.5 mbar | +41% |
| 4 | 64.9 mbar | +125% |

The combination of two layers, each produced by a coating method according to steps i)-ii) (Pattern 1), has the lowest pressure loss. The combination of two layers, each produced by a coating process in the absence of steps i)-ii) (Pattern 4), results in an enormous increase in pressure compared to Pattern 1. The two patterns in which the coating processes for Zone a) and Zone b) differ have an acceptable increase in the pressure loss with respect to Pattern 1, but have a significantly lower pressure loss compared to Pattern 4.

The particle filters described were investigated for their fresh filtration efficiency on the engine test bench in the real exhaust gas of an engine operating on average with stoichiometric air/fuel mixture. A globally standardized test procedure for determining exhaust emissions, or WLTP (worldwide harmonized light vehicles test procedure) for short, was used here. The driving cycle used was WLTC Class 3. The particle filters were installed 30 cm downstream of a conventional three-way catalyst which was the same for all particle filters measured. In order to be able to detect particulate emissions during testing, the particle counters were installed upstream of the three-way catalyst and downstream of the particle filter. Table 7 shows the results of the filtration efficiency measurement.

TABLE 7

| # | FE [%] |
|---|--------|
| 1 | 77 |
| 2 | 86 |
| 3 | 82 |
| 4 | 91 |

Pattern 1 has the lowest filtration efficiency, in which both zones were each produced by the same coating method as in steps i)-ii). In contrast, Pattern 4 in which both zones were also produced by the same coating method, but which differed from that for Pattern 1 by excluding steps i) ii), has the highest filtration efficiency. Although the two Patterns 2 and 3, in which the coating processes for zone a) and zone b) differ and were produced in accordance with steps i) to iii), have a lower filtration efficiency than Pattern 4, they result in a significant increase in filtration efficiency compared to Pattern 1.

FIG. 1 shows by way of example a summary of the effect of different combinations of different on-wall washcoat layers with a view to the effect in the exhaust gas flow. The combination of two layers with a high permeability, each produced via a coating method according to the invention according to method steps i) to iii) by applying a pressure difference and a set pressure difference reversal (Pattern 1), has the lowest pressure loss, but is otherwise weaker in filtration efficiency, light-off temperature and OSC than the other Patterns 2 to 4, The combination of two layers with low permeability, which were each produced by applying a pressure difference via a coating method not according to the invention (Pattern 4), shows very good values with regard to light-off temperature, OSC and filtration efficiency, but results in an enormous increase in pressure. The best combination of all features (pressure loss, filtration efficiency, light-off temperature and OSC) is shown surprisingly by the combination of a layer in the input cell (inflow side of the filter in the exhaust gas) with low permeability, which was produced according to claim 6 by applying a pressure difference with a layer in the output cell (outflow side of the filter in the exhaust gas) with a high permeability/which was produced via a coating method according to claim 1 method steps i) to iii). The optimum setting of the two zone lengths depends on the requirements of the respective motor. The quality criteria of the coated filter can thus be adjusted via the zone length as with a shift regulator.

The invention claimed is:

1. A method for producing coated ceramic wall flow filters having at least two catalytically active zones, the wall flow filter having a first end face, a second end face and a length L and a porosity of at least 50% to at most 80% and a mean pore diameter of 5-50 μm, the method comprising the following steps:
   i) an excess of a first coating suspension is introduced into the first end face by applying a pressure difference via the wall flow filter;
   ii) with a pressure difference reversal, an excess of the first coating suspension is removed from the wall flow filter;
   iii) a second coating suspension without excess is introduced into the wall flow filter via the second end face by applying a pressure difference via the wall flow filter, and
   wherein step ii) is carried out after step i), and
   wherein the pressure difference reversal is applied to the wall flow filter both simultaneously and in a common direction to a flow direction of the second coating suspension being introduced into the wall flow filter in step iii).

2. The method according to claim 1, characterized in that in step i), the first coating suspension is introduced into a vertically locked wall flow filter from a lower, first end face into the wall flow filter, and in step iii) the second coating suspension is introduced from an upper, second end face into the still vertically locked wall flow filter.

3. The method according to claim 1, characterized in that a pressure pulse is utilized for the pressure difference reversal and is at least 150 mbar and at most 400 mbar.

4. The method according to claim 1, characterized in that one zone has a positive gradient for an amount of catalytically active material in the coating direction.

5. A catalytically active wall flow filter for the treatment of exhaust gases of a combustion process produced according to claim 1.

6. The catalytically active wall flow filter according to claim 5, characterized in that the catalytically active coatings of the filter are selected from the group consisting of three-way catalyst, SCR catalyst, nitrogen oxide storage catalyst, oxidation catalyst, soot-ignition coating, hydrocarbon storage.

7. The catalytically active wall flow filter according to claim 6, characterized in that the catalytically active coatings are located in the pores and/or on the surfaces of the channel walls of the filter.

8. A method for treating exhaust gas, comprising passing the exhaust gas as to contact the wall flow filter according to claim 5 in a method for oxidizing hydrocarbons and/or carbon monoxide and/or in a method for reducing nitrogen oxide.

9. The method according to claim 1, wherein step ii) is carried out directly after step i).

10. The method according to claim 1, wherein the first and second coating suspensions have a respective particle size differential such that the wall flow filter has both an in-wall coating and an on-wall coating.

11. The method according to claim 8, wherein the first end face is, in use, positioned at a downstream end of the wall flow filter.

12. The method according to claim 1, wherein the first and second coating suspensions are applied as to overlap by 7%-15% of the length L.

13. The method according to claim 1, wherein the first and second coating suspensions have a common composition, and the common composition is a TWC-TWC coating suspension combination.

14. The method according to claim 1, wherein a suction pulse provides the pressure difference reversal in step ii).

15. The method according to claim 1, wherein the wall flow filter is retained in a continuous vertically locked state through each of steps i); ii) and iii).

16. The method according to claim 1, wherein a pressureless holding time before the pressure difference reversal of between 0 and 2 s is maintained.

17. A method for producing coated ceramic wall flow filters having at least two catalytically active zones, the wall flow filter having a first end face, a second end face and a length L and a porosity of at least 50% to at most 80% and a mean pore diameter of 5-50 μm, the method comprising the following steps:
  i) an excess of a first coating suspension is introduced into the first end face by applying a pressure difference via the wall flow filter;
  ii) with a pressure difference reversal, an excess of the first coating suspension is removed from the wall flow filter;
  iii) a second coating suspension without excess is introduced into the wall flow filter via the second end face by applying a pressure difference via the wall flow filter, and
  wherein step ii) is carried out only after step iii).

18. The method according to claim 17, wherein step ii) is carried out with a pressure pulse that is applied, following introduction of the first and second coating suspensions into contact with the wall flow filter, to both the first and second coating suspensions while still wet.

19. A method for producing coated ceramic wall flow filters having at least two catalytically active zones, the wall flow filter having a first end face, a second end face and a length L and a porosity of at least 50% to at most 80% and a mean pore diameter of 5-50 μm, the method comprising the following steps:
  i) introducing an excess of a first coating suspension into the first end face by applying a pressure difference via the wall flow filter;
  ii) with a pressure difference reversal, removing an excess of the first coating suspension from the wall flow filter;
  iii) introducing a second coating suspension, without excess, into the wall flow filter via the second end face by applying a pressure difference via the wall flow filter, and
  wherein step ii) is carried out simultaneously with step iii) or only after step iii) is completed.

20. The method according to claim 19, characterized in that a pressureless holding time before the pressure difference reversal of up to 10 seconds is maintained.

21. The method according to claim 20 wherein the pressureless holding time before the pressure difference reversal is between 0 and 2 s.

* * * * *